(12) United States Patent
Saon

(10) Patent No.: US 11,942,078 B2
(45) Date of Patent: Mar. 26, 2024

(54) CHUNKING AND OVERLAP DECODING STRATEGY FOR STREAMING RNN TRANSDUCERS FOR SPEECH RECOGNITION

(71) Applicant: INTERNATIONAL BUSINESS MACHINES CORPORATION, Armonk, NY (US)

(72) Inventor: George Andrei Saon, Stamford, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 556 days.

(21) Appl. No.: 17/186,167

(22) Filed: Feb. 26, 2021

(65) Prior Publication Data
US 2022/0277734 A1  Sep. 1, 2022

(51) Int. Cl.
| | | |
|---|---|---|
| *G10L 15/20* | (2006.01) | |
| *G06N 3/044* | (2023.01) | |
| *G06N 3/045* | (2023.01) | |
| *G06N 3/08* | (2023.01) | |
| *G10L 15/16* | (2006.01) | |

(Continued)

(52) U.S. Cl.
CPC .............. *G10L 15/16* (2013.01); *G06N 3/044* (2023.01); *G06N 3/045* (2023.01); *G06N 3/08* (2013.01); *G10L 15/20* (2013.01); *G10L 15/26* (2013.01); *G10L 15/28* (2013.01)

(58) Field of Classification Search
CPC ......... G10L 15/20; G10L 15/26; G10L 15/28; G10L 17/26
See application file for complete search history.

(56) References Cited

U.S. PATENT DOCUMENTS

| | | | |
|---|---|---|---|
| 10,354,662 B2 | 7/2019 | Helmrich et al. | |
| 10,811,000 B2 * | 10/2020 | Le Roux | ................. G10L 17/00 |
| 2008/0046241 A1 * | 2/2008 | Osburn | .................. G10L 17/26 |
| | | | 704/250 |

(Continued)

FOREIGN PATENT DOCUMENTS

| | | | | |
|---|---|---|---|---|
| CN | 111402894 A | | 7/2020 | |
| CN | 113297375 A | * | 8/2021 | ............. G06F 16/35 |

(Continued)

OTHER PUBLICATIONS

Chiu et al., "RNN-T Models Fail To Generalize to Out-Of-Domain Audio: Causes And Solutions", arXiv:2005.03271v3 [eess.AS] Dec. 24, 2020, 8 pages.

(Continued)

*Primary Examiner* — Feng-Tzer Tzeng
(74) *Attorney, Agent, or Firm* — Tutunjian & Bitetto, P.C.; Stosch Sabo

(57) ABSTRACT

A computer-implemented method is provided for improving accuracy recognition of digital speech. The method includes receiving the digital speech. The method further includes splitting the digital speech into overlapping chunks. The method also includes computing a bidirectional encoder embedding of each of the overlapping chunks to obtain bidirectional encoder embeddings. The method additionally includes combining the bidirectional encoder embeddings. The method further includes interpreting, by a speech recognition system, the digital speech using the combined bidirectional encoder embeddings.

20 Claims, 9 Drawing Sheets

(51) Int. Cl.
  *G10L 15/26* (2006.01)
  *G10L 15/28* (2013.01)

(56) References Cited

U.S. PATENT DOCUMENTS

| | | |
|---|---|---|
| 2016/0050420 A1 | 2/2016 | Helmrich et al. |
| 2019/0034795 A1 | 1/2019 | Zitouni et al. |
| 2019/0130903 A1* | 5/2019 | Sriram .................. G10L 15/063 |
| 2019/0385595 A1 | 12/2019 | Wabgaonkar et al. |
| 2020/0126538 A1* | 4/2020 | Han ...................... G10L 15/063 |
| 2020/0372906 A1 | 11/2020 | Jang et al. |
| 2021/0074264 A1* | 3/2021 | Liang ...................... G10L 15/28 |

FOREIGN PATENT DOCUMENTS

| | | |
|---|---|---|
| JP | 2019120841 A | 7/2019 |
| WO | 2021002967 A1 | 1/2021 |

OTHER PUBLICATIONS

Graves, Alex, "Sequence Transduction with Recurrent Neural Networks", arXiv:1211.3711v1 [cs.NE] Nov. 14, 2012, 9 pages.
Jain et al., "RNN-T For Latency Controlled ASR with Improved Beam Search", arXiv:1911.01629v2 [cs.CL] Jan. 16, 2020, 5 pages.
Jurata et al., "Knowledge Distillation from Offline to Streaming RNN Transducer for End-to-end Speech Recognition", INTERSPEECH 2020, Oct. 2020, pp. 2117-2121.
Li et al., "Improving Rnn Transducer Modeling for End-To-End Speech Recognition", arXiv:1909.12415v1 [cs.CL] Sep. 26, 2019, 8 pages.
Mell et al. "The NIST Definition of Cloud Computing", NIST Special Publication 800-145, 2011, 7 pages.
Kurata, Gakuto, et al. "Guiding CTC posterior spike timings for improved posterior fusion and knowledge distillation", arXiv preprint arXiv:1904.08311. Apr. 17, 2019, pp. 1-5.
Sainath, Tara N., et al. "Two-pass end-to-end speech recognition", arXiv preprint arXiv:1908.10992. Aug. 29, 2019, pp. 1-5.
Hu, Ke, et al. "Deliberation model based two-pass end-to-end speech recognition", InICASSP 2020-2020 IEEE International Conference on Acoustics, Speech and Signal Processing (ICASSP). May 4, 2020, pp. 7799-7803.
International Search Report issued in PCT Application No. PCT/EP2021/075007, dated Jan. 5, 2022, pp. 1-11.
International Search Report issued in PCT Application No. PCT/CN2022/072268, dated Apr. 13, 2022, pp. 1-9.

* cited by examiner

CHUNKING AND OVERLAP DECODING STRATEGY FOR STREAMING RNN TRANSDUCERS FOR SPEECH RECOGNITION

BACKGROUND

The present invention generally relates to speech recognition and artificial intelligence, and more particularly to a chunking and overlap decoding strategy for streaming Recurrent Neural Network (RNN) transducers for end-to-end speech recognition.

Hybrid modeling is a known technique for speech recognition that involves a hidden Markov Model (HMM) and a model used for state observation likelihoods which is typically a deep neural network (DNN). The HMM states are obtained by decision tree clustering of subphonetic units based on surrounding phonetic context. End-to-end speech recognition with RNN transducers has advantages for both training and inference. For example, it requires significantly fewer training steps compared to hybrid modeling. Moreover, RNN-Ts have a higher accuracy, a lower memory footprint, and faster inference compared to hybrid models. However, RNN-T based speech recognition still suffers from deficiencies such as having less reliable time alignments for the words that are being produced compared to hybrid speech recognition.

SUMMARY

According to aspects of the present invention, a computer-implemented method is provided for improving accuracy recognition of digital speech. The method includes receiving the digital speech. The method further includes splitting the digital speech into overlapping chunks. The method also includes computing a bidirectional encoder embedding of each of the overlapping chunks to obtain bidirectional encoder embeddings. The method additionally includes combining the bidirectional encoder embeddings. The method further includes interpreting, by a speech recognition system, the digital speech using the combined bidirectional encoder embeddings.

According to other aspects of the present invention, a computer program product is provided for improving accuracy recognition of digital speech. The computer program product includes a non-transitory computer readable storage medium having program instructions embodied therewith. The program instructions are executable by a computer to cause the computer to perform a method. The method includes receiving the digital speech. The method further includes splitting the digital speech into overlapping chunks. The method also includes computing a bidirectional encoder embedding of each of the overlapping chunks to obtain bidirectional encoder embeddings. The method additionally includes combining the bidirectional encoder embeddings. The method further includes interpreting, by a speech recognition system, the digital speech using the combined bidirectional encoder embeddings.

According to yet other aspects of the present invention, a speech recognition system is provided. The speech recognition system includes a memory device for storing program code. The speech recognition system further includes a processor device operatively coupled to the memory device for running the program code to receive digital speech. The processor device further runs the program code to split the digital speech into overlapping chunks. The processor device also runs the program code to compute a bidirectional encoder embedding of each of the overlapping chunks to obtain bidirectional encoder embeddings. The processor device additionally runs the program code to combine the bidirectional encoder embeddings. The processor device further runs the program code to interpret the digital speech using the combined bidirectional encoder embeddings.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to a chunking and overlap decoding strategy for streaming RNN transducers for end-to-end speech recognition.

Embodiments of the present invention can compute bidirectional embeddings on overlapping chunks of audio during inference.

During model training, training utterances can be split into overlapping chunks and a bidirectional encoder embedding can be separately computed on each overlapping chunk to obtain bidirectional encoding embeddings. The bidirectional encoder embeddings for the entire utterance can be obtained by concatenating the bidirectional encoder embeddings for each chunk. The size of the chunks and the amount of overlap can be randomized or fixed during model training.

At test time, an input utterance can be split into overlapping chunks. For each chunk, bidirectional encoder embeddings can be computed. In the regions of overlap, the embeddings can be combined in one or more of the following ways as examples: (1) use the embeddings from the following chunk; (2) average the embeddings from two chunks; and (3) use the embeddings from the left chunk for the first half and the right chunk for the second half.

Figure 1:
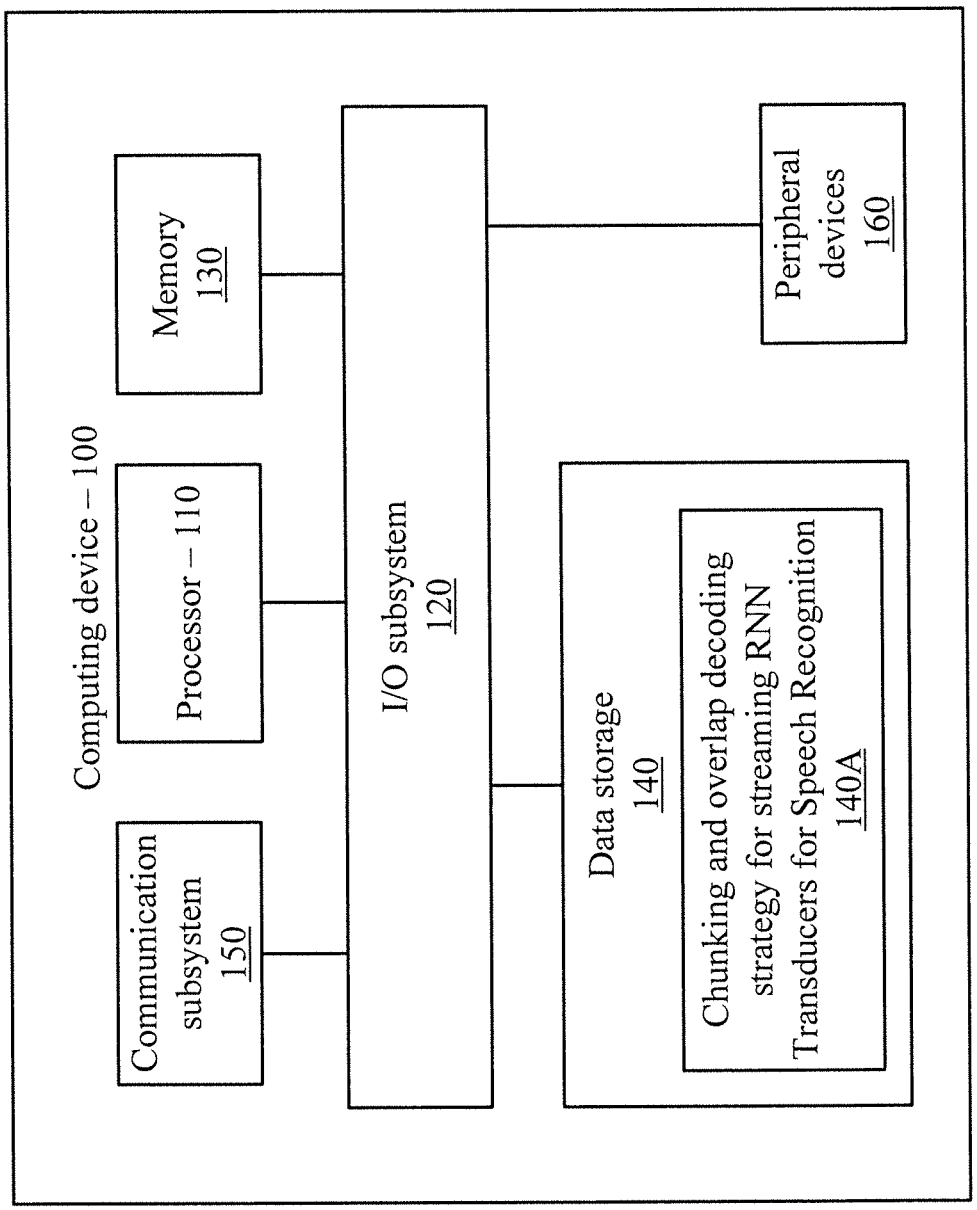
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform chunking and overlap decoding for streaming RNN-Ts for end-to-end speech recognition.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for chunking and overlap decoding for streaming RNN-Ts for end-to-end speech recognition. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 8-9). These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
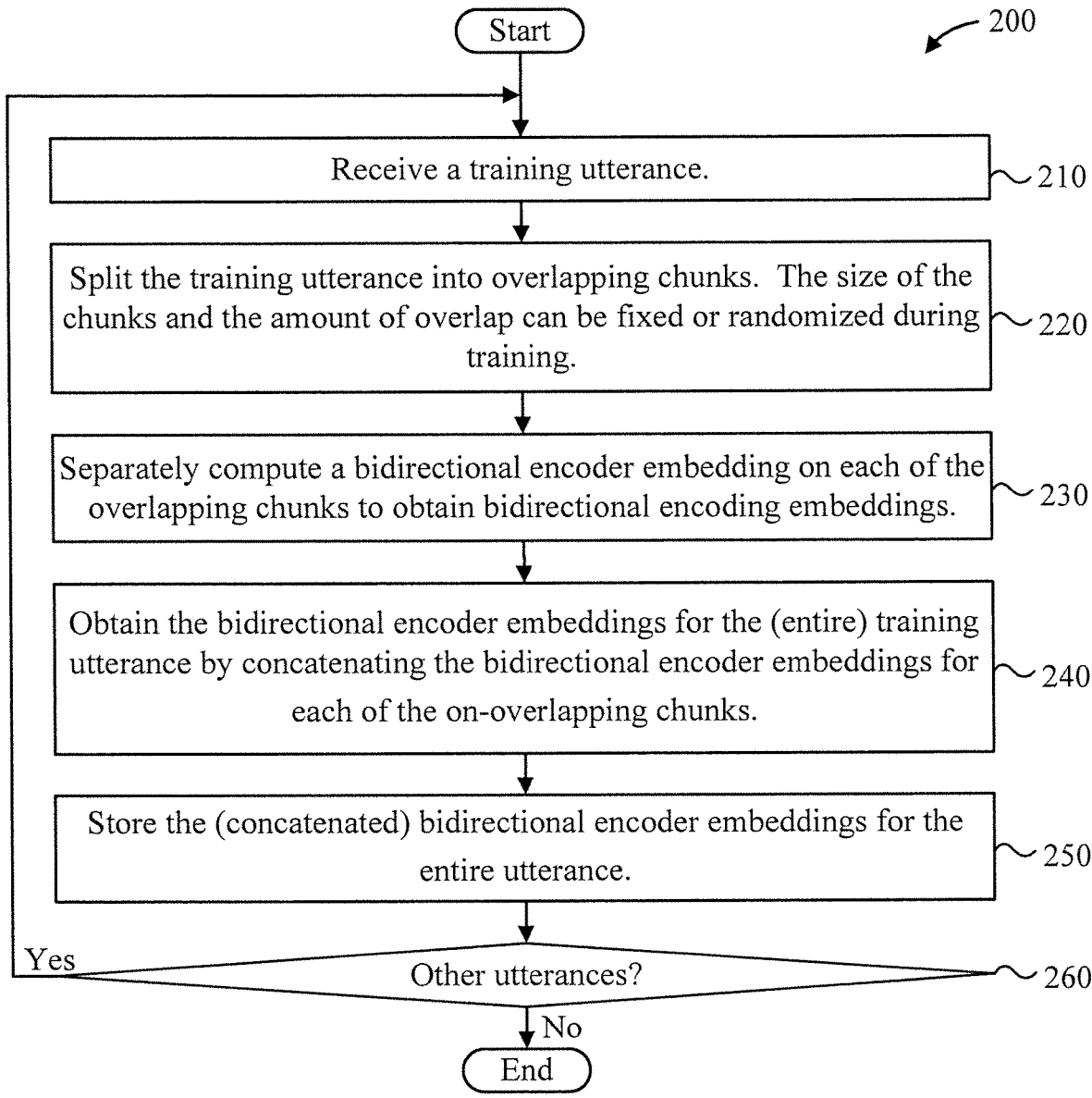
FIG. 2 is a flow diagram showing an exemplary method for Recurrent Neural Network Transducer (RNN-T) model training for speech recognition, in accordance with an embodiment of the present invention.

These and other variations of a hardware processor subsystem are also contemplated in accordance with embodiments of the present invention FIG. 2 is a flow diagram showing an exemplary method 200 for Recurrent Neural Network Transducer (RNN-T) model training for speech recognition, in accordance with an embodiment of the present invention.

At block 210, receive a training utterance.

At block 220, split the training utterance into overlapping chunks. The size of the chunks and the amount of overlap can be fixed or randomized during training. Overlapping chunks are used in order to preserve/carry some information from one chunk to the next to increase accuracy at the cost of latency for processing the overlapping audio input region twice.

At block 230, separately compute a bidirectional encoder embedding on each of the overlapping chunks to obtain bidirectional encoding embeddings.

At block 240, obtain the bidirectional encoder embeddings for the (entire) training utterance by concatenating the bidirectional encoder embeddings for each of the overlapping chunks.

At block 250, store the (concatenated) bidirectional encoder embeddings for the entire utterance.

At block 260, determine whether there are any other utterances. If so, return to step 210 and repeat for a next utterance in order to process a corpus of training utterances. Otherwise, terminate the method. In another embodiment, multiple utterances are processed in parallel.

Figure 3:
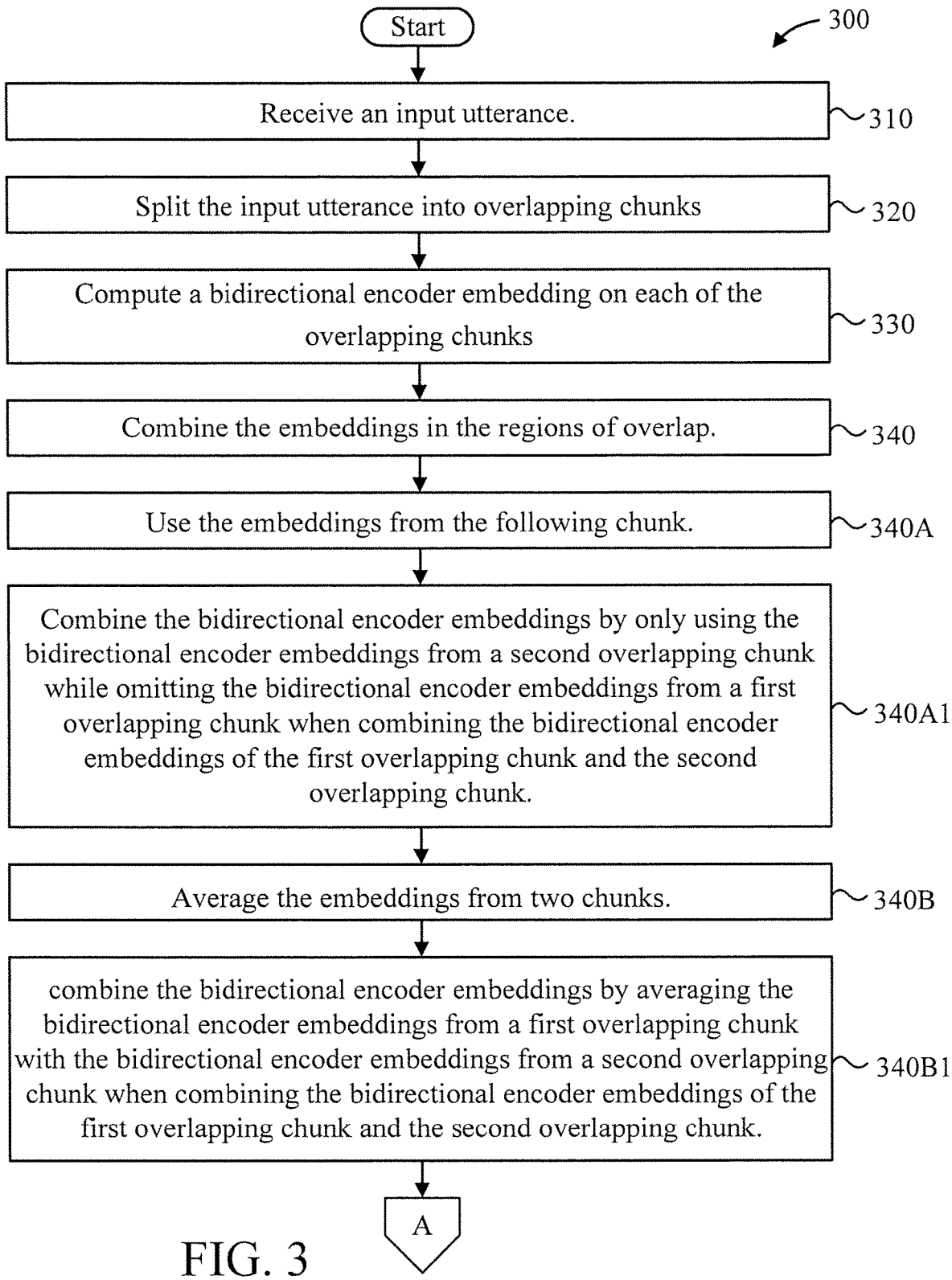
FIGS. 3-4 are flow diagrams showing an exemplary method for Recurrent Neural Network Transducer (RNN-T) model inference for speech recognition, in accordance with an embodiment of the present invention.
Figure 4:
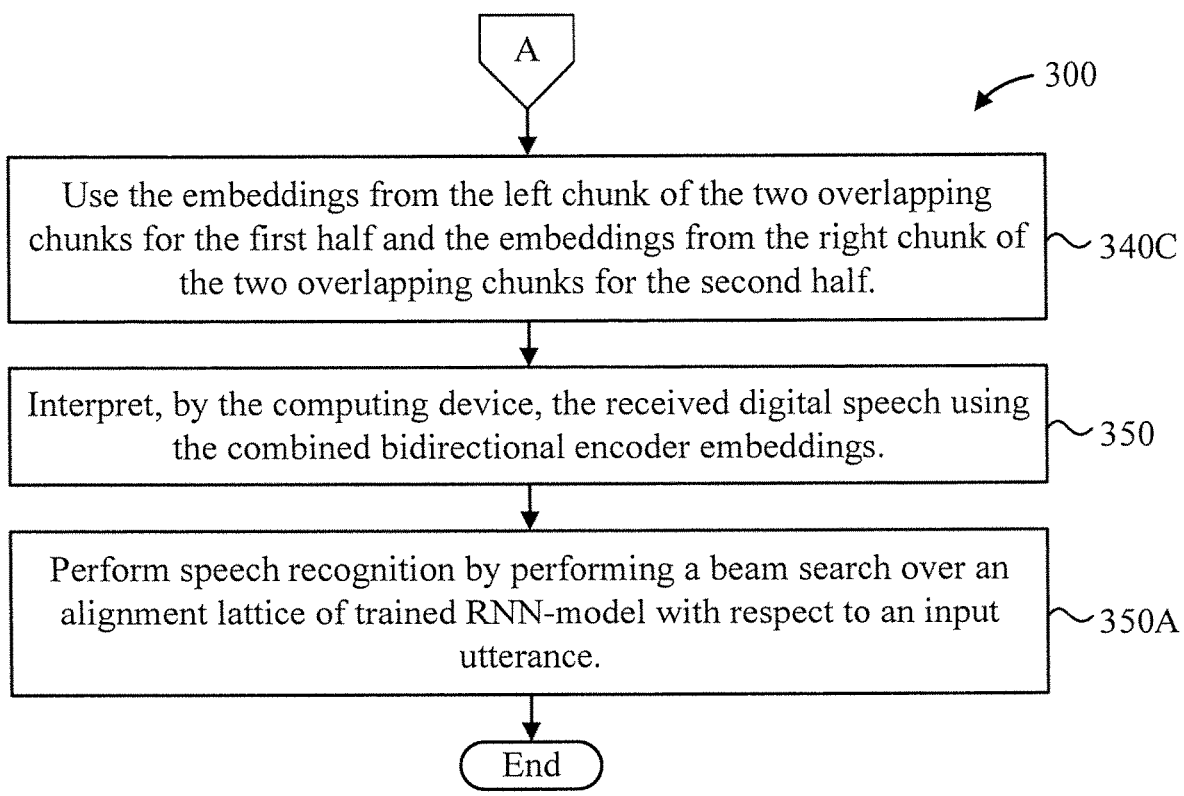

FIGS. 3-4 are flow diagrams showing an exemplary method 300 for Recurrent Neural Network Transducer (RNN-T) model inference for speech recognition, in accordance with an embodiment of the present invention.

At block 310, receive an input utterance.

At block 320, split the input utterance into overlapping chunks. In an embodiment, an amount of overlap between the overlapping chunks is a parameter at inference time used to control accuracy versus latency. For the same chunk size, the larger the overlap, the greater the accuracy and the latency, while the smaller the overlap, the lesser the accuracy and the latency.

At block 330, compute a bidirectional encoder embedding on each of the overlapping chunks.

At block 340, combine the embeddings in the regions of overlap.

As examples, in regions of overlap, the embeddings can be combined in one or more of the following ways as shown in block 340A through 340C.

At block 340A, use the embeddings from the following chunk. In an embodiment, this can mean the second chunk of the 2 overlapping chunks having the regions of overlap.

In an embodiment, block 340A, can include blocks 340A1.

At block 340A1, combine the bidirectional encoder embeddings by only using the bidirectional encoder embeddings from a second overlapping chunk while omitting the bidirectional encoder embeddings from a first overlapping chunk when combining the bidirectional encoder embeddings of the first overlapping chunk and the second overlapping chunk. This can be considered to involve setting the bidirectional encoder embeddings of a first overlapping chunk to zero and combining that zero with the bidirectional encoder embeddings of the second overlapping chunk At block 340B, average the embeddings from two chunks. This can mean the two overlapping chunks.

In an embodiment, block 340B, can include blocks 340B1.

At block 340B1, combine the bidirectional encoder embeddings by averaging the bidirectional encoder embeddings from a first overlapping chunk with the bidirectional encoder embeddings from a second overlapping chunk when combining the bidirectional encoder embeddings of the first overlapping chunk and the second overlapping chunk.

At block 340C, use the embeddings from the left chunk of the two overlapping chunks for the first half and the embeddings from the right chunk of the two overlapping chunks for the second half.

At block 350, interpret, by the computing device, the received digital speech using the combined bidirectional encoder embeddings.

In an embodiment, block 350 can include block 350A.

At block 350A, perform speech recognition by performing a beam search over an alignment lattice of trained RNN-model with respect to an input utterance.

A description will now be given regarding a Recurrent Neural Network Transducer (RNN-T) model, in accordance with an embodiment of the present invention.

To that end, $y=(y_1, \ldots, y_U) \in y^*$ output sequence (typically characters, words or morphemes), and $x=(x_1, \ldots, x_T) \in x^*$ input sequence (acoustic frames extracted from speech signal).

The RNN-T models a conditional distribution of y given x as follows:

$$p(y|x) = \sum_{a \in B^{-1}(y)} p(a|x)$$

$a=(a_1, \ldots, a_{T+U})$ is an alignment sequence. $a_i \in \bar{Y} = \gamma \cup \{\emptyset\}$ belong to the augmented output space where $\emptyset$ (called BLANK) denotes the null output B: $\bar{Y} \rightarrow y^*$ strips the BLANKs from a such that B(a)=y.

Figure 5:
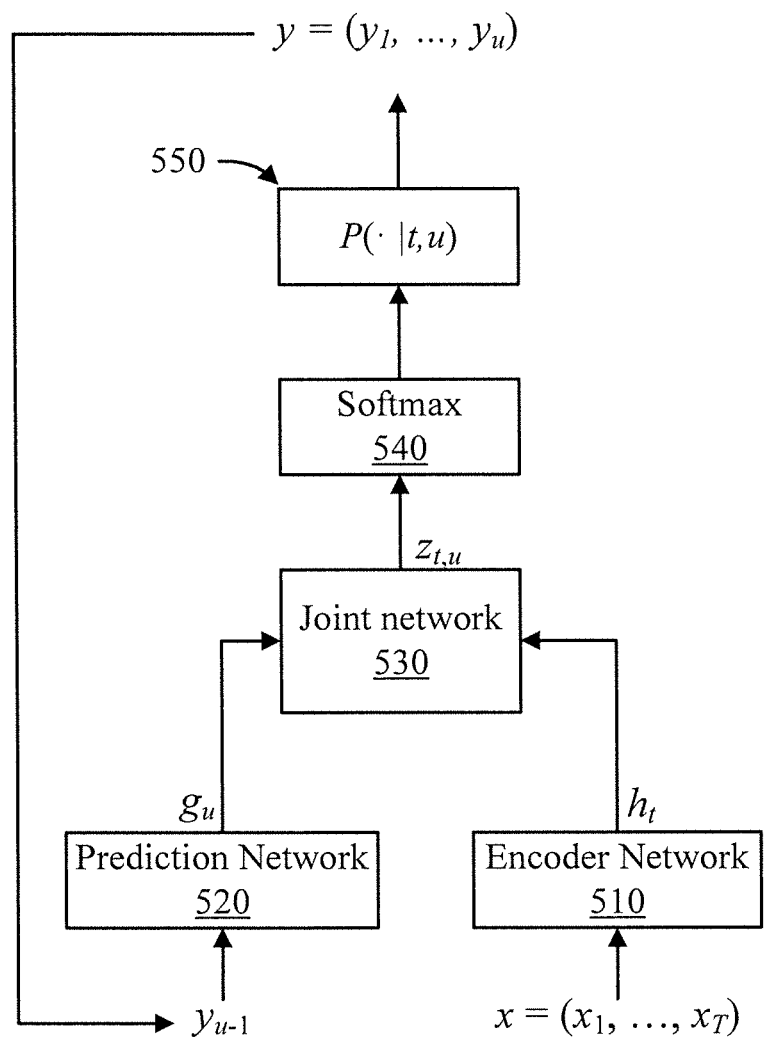
FIG. 5 is a block diagram showing an exemplary RNN-T architecture, in accordance with an embodiment of the present invention.

FIG. 5 is a block diagram showing an exemplary RNN-T architecture 500, in accordance with an embodiment of the present invention.

Thus, FIG. 5 shows a representation of an RNN-T, with the input audio samples, x, and the predicted symbols y. The predicted symbols (outputs of the softmax layer) are fed back into the model through the Prediction network, as $y_{u-1}$, ensuring that the predictions are conditioned both on the audio samples so far and on past outputs.

The unidirectional RNN-T architecture 500 includes an encoder network (also called a transcription network) 510, a prediction network 520, a joint network 530, and a softmax block 540. The prediction network 520 and encoder network 510 can be LSTM RNNs, and the joint network 530 can be a feedforward network. Of course, other structures such as Transformers, Conformers, convolutional networks, recurrent networks, feedforward networks (DNN) can be used given the teachings of the present invention provided herein.

The encoder network 510 computes a high-dimensional embedding $h=(h_1, \ldots, h_{T'})$ of the input sequence ($T' \le T$). The encoder network 510 is analogous to the acoustic model, which converts the acoustic feature $x_t$ into a high-level representation $h_t$, where t is a time index. In these contexts, a high-dimensional embedding refers to an embedding having at least 1024 dimensions. Given the input features, unidirectional long short-term memory (LSTM) layers can be stacked to construct the encoder network 510, or some other encoding structure can be used as described herein.

The prediction network 520 computes a high-dimensional embedding $g=(g_1, \ldots, g_U)$ of the output sequence via the recursion $g_u=\text{Prediction}(g_{u-1}, y_{u-1})$. The prediction network 520 works like a RNN language model, which produces a high-level representation $h_t$ by conditioning on the previous non-blank target $y_{u-1}$ predicted by the RNN-T model, where u is output label index.

The joint network 530 computes the predictive output distribution $p(\cdot|t, u)$ 550 over $\bar{y}$ and is commonly implemented as follows:

$$z_{t,u}=W^{out}\tan h(W^{enc}h_t+W^{pred}g_u+b),$$

$$p(\cdot|t,u)=\text{softmax}(z_{t,u}) t=1 \ldots T, u=1 \ldots U.$$

The joint network 530 is a feed-forward network that combines the encoder network output and the prediction network output.

RNN-Ts are a form of sequence-to-sequence models that do not employ attention mechanisms. Unlike most sequence-to-sequence models, which typically need to process the entire input sequence (the waveform in our case) to produce an output (the sentence), the RNN-T continuously processes input samples and streams output symbols, a property that is welcome for speech dictation. In an implementation, the output symbols can be the characters of the alphabet. The RNN-T recognizer outputs characters one-by-one, as you speak, with white spaces where appropriate. It does this with a feedback loop that feeds symbols predicted by the model back into it to predict the next symbols.

In one exemplary embodiment, the RNN_T model includes 6 bidirectional encoder layers with 640 units/direction, 1 unidirectional prediction layer with 1024 units, and a joint network of size 256 without an output layer of size 40. Of course, other numbers of layers and units can be used, while maintaining the spirit of the present invention.

Figure 6:
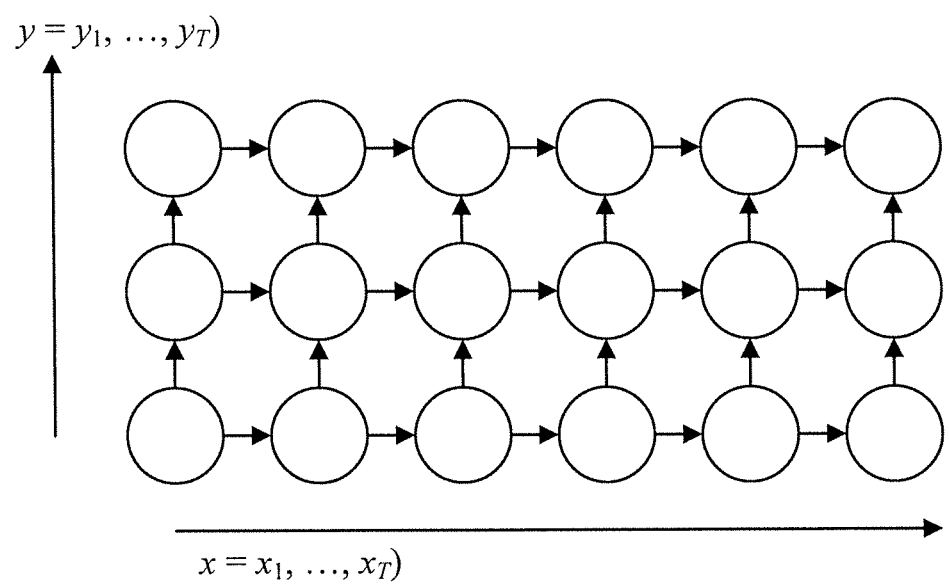
FIG. 6 is a diagram showing an exemplary alignment trellis, in accordance with an embodiment of the present invention.

FIG. 6 is a diagram showing an exemplary alignment trellis 600, in accordance with an embodiment of the present invention.

The alignment trellis 600 can be considered relative to an x axis and a y axis such that $x=(x_1, \ldots, x_T)$ and $y=(y_1, \ldots, y_U)$.

Each node in the alignment trellis 600 represents a softmax of $z_{t,u}$.

Speech recognition with the RNN-T architecture 600 is realized by a beam search over the alignment trellis 600.

Figure 7:
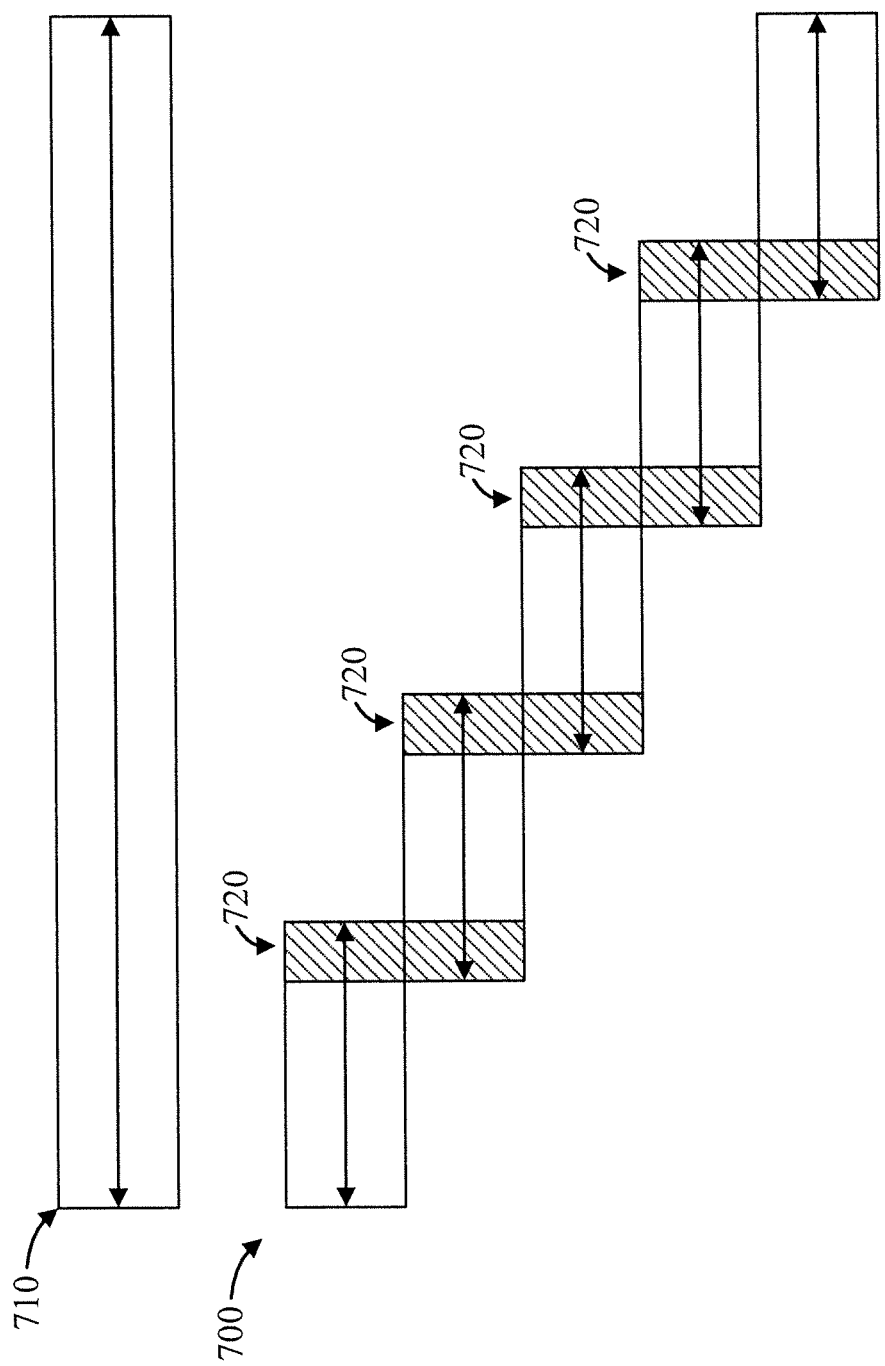
FIG. 7 is a block diagram showing an exemplary encoder computation, in accordance with an embodiment of the present invention.

FIG. 7 is a block diagram showing an exemplary encoder computation 700, in accordance with an embodiment of the present invention.

The encoder computation 700 is made from an input utterance 710.

The encoder computation 700 includes bidirectional overlapping chunks 720.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
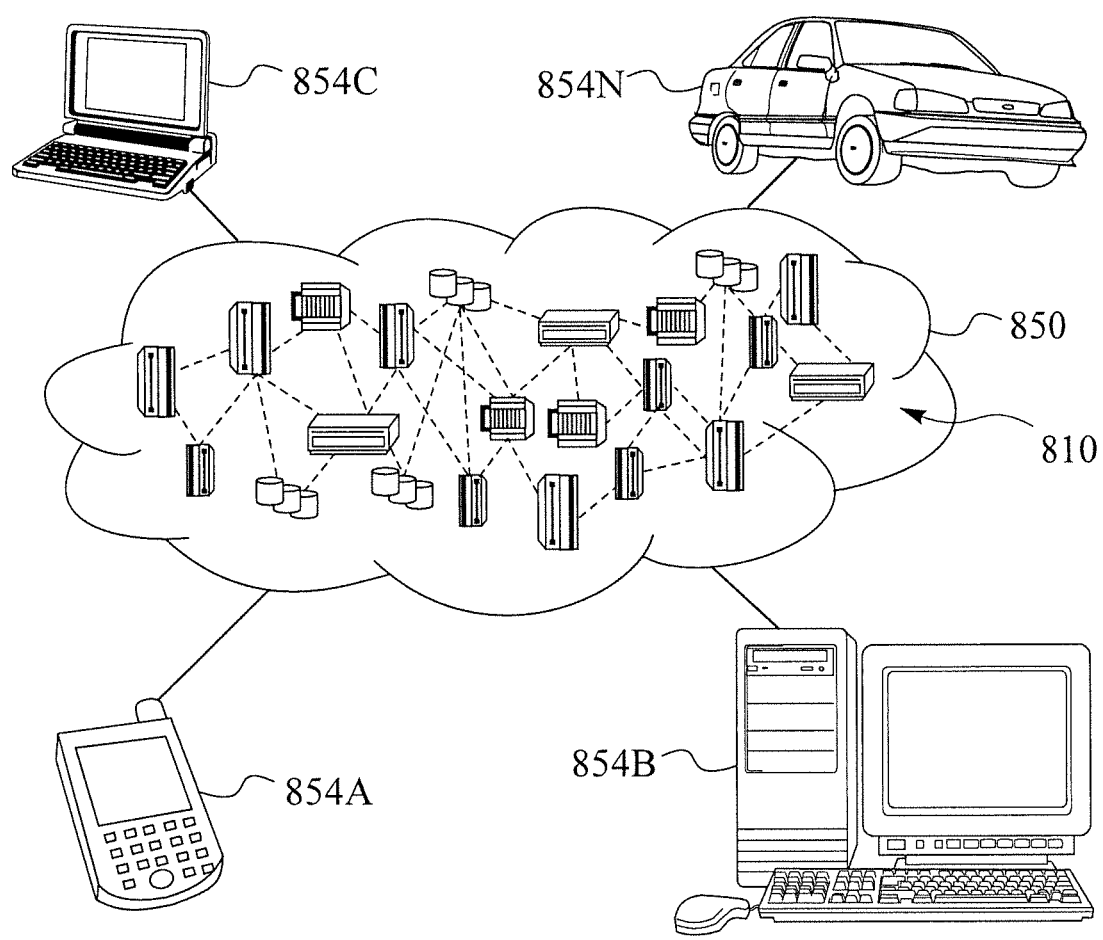
FIG. 8 is a block diagram showing an illustrative cloud computing environment having one or more cloud computing nodes with which local computing devices used by cloud consumers communicate, in accordance with an embodiment of the present invention.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
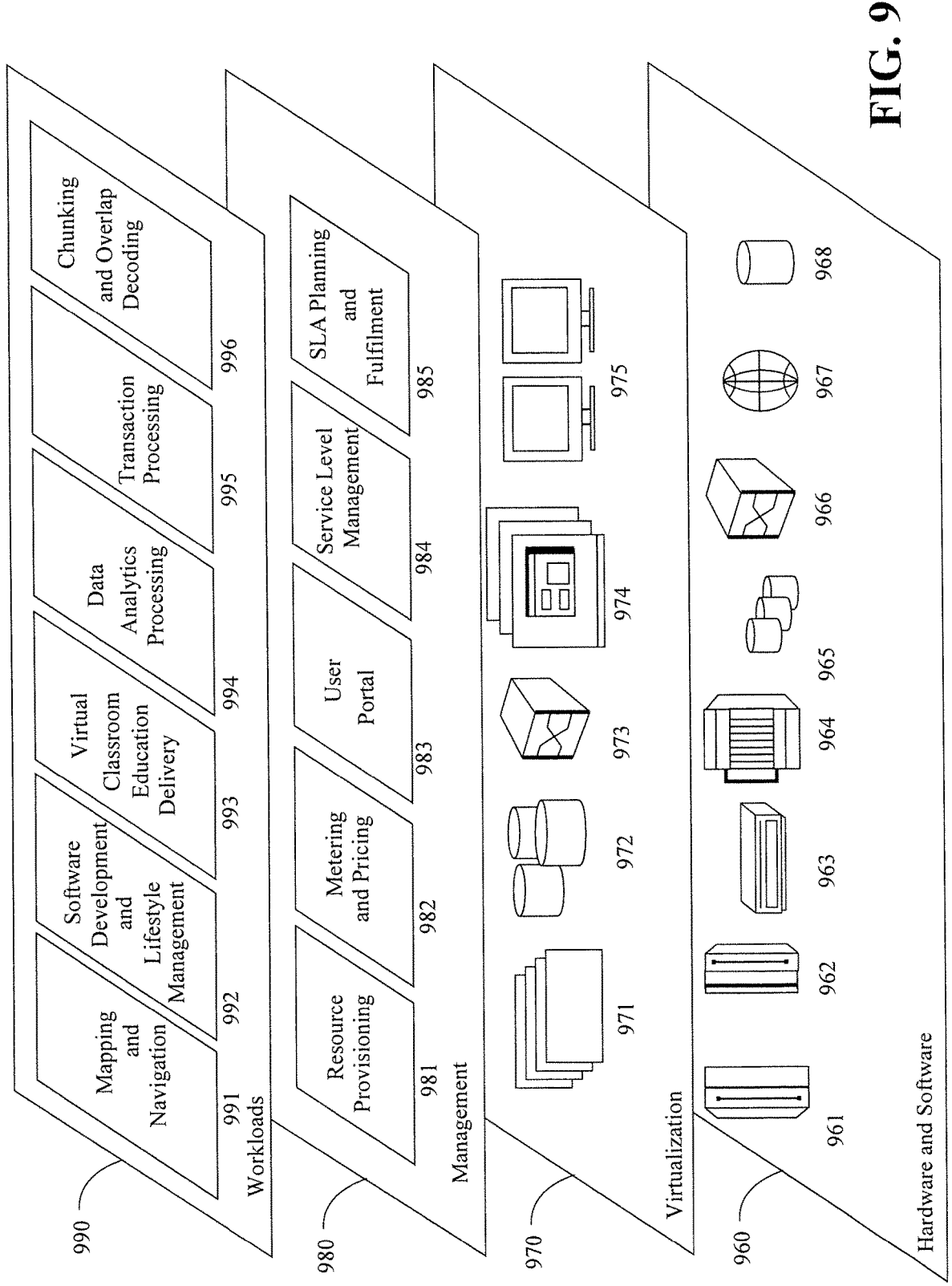
FIG. 9 is a block diagram showing a set of functional abstraction layers provided by a cloud computing environment, in accordance with an embodiment of the present invention.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 9860 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and chunking and overlap decoding for streaming RNN-Ts for end-to-end speech recognition 996.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims.

Having thus described aspects of the invention, with the details and particularity required by the patent laws, what is claimed and desired protected by Letters Patent is set forth in the appended claims:

1. A computer-implemented method for improving accuracy recognition of digital speech, comprising:
   receiving the digital speech;
   splitting the digital speech into overlapping chunks;
   computing a bidirectional encoder embedding of each of the overlapping chunks to obtain bidirectional encoder embeddings;
   combining the bidirectional encoder embeddings; and interpreting, by a speech recognition system, the digital speech using the combined bidirectional encoder embeddings.

2. The computer-implemented method of claim 1, wherein said combining combines the bidirectional encoder embedding by only using the bidirectional encoder embeddings from a second overlapping chunk while omitting the bidirectional encoder embeddings from a first overlapping chunk when combining the bidirectional encoder embeddings of the first overlapping chunk and the second overlapping chunk.

3. The computer-implemented method of claim 1, wherein said combining comprises averaging the bidirectional encoder embeddings from a first overlapping chunk with the bidirectional encoder embeddings from a second overlapping chunk when combining the bidirectional encoder embeddings of the first overlapping chunk and the second overlapping chunk.

4. The computer-implemented method of claim 1, wherein said combining comprises using the bidirectional encoder embeddings from a left one of the overlapping chunks for a first half and a right one of the overlapping chunks for a second half of a final result.

5. The computer-implemented method of claim 1, wherein the speech recognition system uses a recurrent neural network transducer model to interpret the received digital speech.

6. The computer-implemented method of claim 5, wherein the recurrent neural network transducer model comprises a joint network operatively coupled to a prediction network and an encoder.

7. The computer-implemented method of claim 6, wherein the recurrent neural network transducer model further comprises a softmax layer operatively coupled to the joint network that converts an output of the joint network to a conditional probability distribution.

8. The computer-implemented method of claim 5, wherein overlapping chunks are used during a training session of the recurrent neural network transducer model.

9. The computer-implemented method of claim 5, wherein a chunk size is randomized during a training session of the recurrent neural network transducer model.

10. The computer-implemented method of claim 5, wherein a chunk size is fixed during a training session of the recurrent neural network transducer model.

11. The computer-implemented method of claim 5, wherein an amount of chunk overlap is fixed during a training session of the recurrent neural network transducer model.

12. The computer-implemented method of claim 5, wherein an amount of chunk overlap is randomized during a training session of the recurrent neural network transducer model.

13. The computer-implemented method of claim 5, wherein the encoder is configured to simulate an acoustic model in the speech recognition system and an prediction network is configured to simulate a language model in the speech recognition system.

14. The computer-implemented method of claim 5, wherein said interpreting comprises performing a beam search over an alignment lattice of the recurrent neural network transducer model.

15. The computer-implemented method of claim 1, wherein an amount of overlap between the overlapping chunks is a parameter at inference time used to control accuracy versus latency.

16. The computer-implemented method of claim 1, wherein overlapping regions of the overlapping chunks comprise acoustic encoder overlap in a recurrent neural network transducer model.

17. A computer program product for improving accuracy recognition of digital speech, the computer program product comprising a non-transitory computer readable storage medium having program instructions embodied therewith, the program instructions executable by a computer to cause the computer to perform a method comprising:
receiving the digital speech;
splitting the digital speech into overlapping chunks;
computing a bidirectional encoder embedding of each of the overlapping chunks to obtain bidirectional encoder embeddings;
combining the bidirectional encoder embeddings; and
interpreting, by a speech recognition system, the digital speech using the combined bidirectional encoder embeddings.

18. The computer program product of claim 17, wherein said combining combines the bidirectional encoder embeddings by only using the bidirectional encoder embeddings from a second overlapping chunk while omitting the bidirectional encoder embeddings from a first overlapping chunk when combining the bidirectional encoder embeddings of the first overlapping chunk and the second overlapping chunk.

19. The computer program product of claim 17, wherein said combining comprises averaging the bidirectional encoder embeddings from a first overlapping chunk with the bidirectional encoder embeddings froze a second overlapping chunk when combining the bidirectional encoder embeddings of the first overlapping chunk and the second overlapping chunk.

20. A speech recognition system, comprising:
a memory device for storing program code; and
a processor device operatively coupled to the memory device for running the program code to:
receive digital speech;
split the digital speech into overlapping chunks;
compute a bidirectional encoder embedding of each of the overlapping chunks to obtain bidirectional encoder embeddings;
combine the bidirectional encoder embeddings; and
interpret the digital speech using the combined bidirectional encoder embeddings.

* * * * *